(12) United States Patent
Suzuki

(10) Patent No.: US 7,049,777 B2
(45) Date of Patent: May 23, 2006

(54) MOTOR CONTROL DEVICE AND MOTOR CONTROL METHOD

(75) Inventor: Hiroshi Suzuki, Okazaki (JP)

(73) Assignees: Favess Co., Ltd., Okazaki (JP); Toyoda Koki Kabushiki Kaisha, Kariya (JP); Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 10/972,480

(22) Filed: Oct. 26, 2004

(65) Prior Publication Data
US 2005/0093497 A1 May 5, 2005

(30) Foreign Application Priority Data
Oct. 29, 2003 (JP) .............................. 2003-368440

(51) Int. Cl.
H02P 27/04 (2006.01)
H02M 1/12 (2006.01)

(52) U.S. Cl. .................. 318/599; 318/811; 363/41; 363/43; 363/98

(58) Field of Classification Search ................... None
See application file for complete search history.

(56) References Cited

U.S. PATENT DOCUMENTS

| | | | | |
|---|---|---|---|---|
| 5,036,264 A | * | 7/1991 | Ueki | 318/254 |
| 5,153,821 A | | 10/1992 | Blasko | |
| 5,610,806 A | | 3/1997 | Blasko et al. | |
| 5,652,487 A | * | 7/1997 | Nishino et al. | 318/434 |
| 5,706,186 A | | 1/1998 | Blasko | |
| 5,831,843 A | * | 11/1998 | Lindberg et al. | 363/41 |
| 6,023,417 A | * | 2/2000 | Hava et al. | 363/41 |
| 6,529,393 B1 | | 3/2003 | Yu | |
| 6,538,404 B1 | * | 3/2003 | Kato et al. | 318/254 |

FOREIGN PATENT DOCUMENTS

| | | |
|---|---|---|
| EP | 0 868 015 A1 | 9/1998 |
| JP | 59159690 A * | 9/1984 |
| JP | 02060493 A * | 2/1990 |
| WO | WO 00/70734 | 11/2000 |

OTHER PUBLICATIONS

H. Sugiyama, et al., "Theory and Practical Design for AC Servo System", Sougou-Denshi Publishing Company, Tokyo, Ver. 4, Feb. 10, 1997, pp. 44-47.

* cited by examiner

*Primary Examiner*—Marlon T. Fletcher
*Assistant Examiner*—Eduardo Colon Santana
(74) *Attorney, Agent, or Firm*—Oblon, Spivak, McClelland, Maier & Neustadt, P.C.

(57) ABSTRACT

A motor control device is provided with a neutral point shift section. The neutral point shift section shifts a neutral point (command neutral point) of phase voltage commands so that the values of the phase voltage commands after the shifting of the neutral point come within the amplitude of a triangular wave (triangular wave signal), and inputs the phase voltage commands with the neutral point having been shifted, to a control signal output section. Thus, the motor control device is enabled to heighten the output voltage without bringing about increase in manufacturing cost and substantial delay in calculation interval.

5 Claims, 5 Drawing Sheets

MOTOR CONTROL DEVICE AND MOTOR CONTROL METHOD

INCORPORATION BY REFERENCE

This application is based on and claims priority under 35 U.S.C. 119 with respect to Japanese Application No. 2003-368440 filed on Oct. 29, 2003, the entire content of which is incorporated herein by reference.

BACKGROUND OF THE INVENTION

1. Field of the Invention

The present invention relates to a motor control device and a motor control method.

2. Discussion of the Related Art

Heretofore, a motor control device for controlling the operation of a brushless motor is provided with an output circuit composed of a plurality of switching elements such as power MOSFETs or the like and supplies the brushless motor with drive electric powers for three phases U, V and W generated from a direct current, by controlling duty operations of the switching elements.

In the motor control device of this type, there has been in wide use a triangular wave comparison PWM (Pulse Width Modulation) for generating motor control signals for the U, V and W phases by comparing a triangular wave signal (hereafter referred simply as "triangular wave") as a carrier wave with phase voltage commands $Vu^*$, $Vv^*$ and $Vw^*$ which respectively take as reference waves sine waves represented by the following expression (1).

(Expression 1)

$$\left. \begin{array}{l} Vu* = \alpha \cdot Vc \cdot \sin\theta \\ Vv* = \alpha \cdot Vc \cdot \sin(\theta - 2\pi/3) \\ Vw* = \alpha \cdot Vc \cdot \sin(\theta + 2\pi/3) \end{array} \right\} \quad (1)$$

$\alpha$: ($-1 \leq \alpha \leq 1$): modulation factor (control factor)

Vc: amplitude of triangular wave

In the conventional triangular wave comparison PWM, where the supply voltage is taken as VB, sine waves are formed by the U, V, W phase voltages at respective output points relative to an imaginary neutral point in the direct current power supply, that is, by the reference waves of respective phase voltages VuN, VvN, VwN, and the amplitude of the sine waves becomes $\alpha \cdot VB/2$. The amplitude of the line voltages Vuv, Vvw, Vwu between the U, V, W phases becomes square root of three ($\sqrt{3}$) times as large as the maximum amplitude of the reference waves of the respective phase voltages VuN, VvN, VwN. That is, the amplitude of the line voltages Vuv, Vvw, Vwu becomes $\alpha \cdot \sqrt{3/2} \cdot VB$.

By the way, in brushless motors, a problem arises in that back electromotive force which is exerted on the coils upon the rotation of an armature becomes greater than the line voltages Vuv, Vvw, Vwu between the respective phases with increase in the rotational speed, so that the electric current can no longer be flown through the coils. Therefore, in order to operate the motor in a high speed, it is necessary to increase an inverter output voltage so that the line voltages Vuv, Vvw, Vwu between the U, V, W phases to be supplied to the brushless motor can be raised (i.e., heightened).

However, in the known PWM with triangular wave comparison, the amplitude of the phase voltage commands $Vu^*$, $Vv^*$, $Vw^*$ has to be smaller than that of the triangular wave. For this reason, in a conventional PWM with triangular wave comparison, if the maximum value of the amplitude of the reference waves of the line voltages Vuv, Vvw, Vwu between the respective phases exceeds $\sqrt{3/2} \cdot VB$, the proportional relationship is lost between the amplitude of the reference waves of the line voltages Vuv, Vvw, Vwu for the respective phases and the modulation factor ($\alpha$). This gives rise to a problem that the PWM control cannot be performed normally thereby causing the brushless motor to generate noise and torque ripple.

To obviate this problem, if an attempt is made to make the maximum value of the amplitude of the reference waves of the line voltages Vuv, Vvw, Vwu greater than $\sqrt{3/2} \cdot VB$, the supply voltage VB itself has to be heightened by using a booster circuit or the like. In the case so attempted, there arises another problem that besides the addition of the booster circuit, review is required regarding the withstand voltage capability of the output circuit including switching elements thereby resulting in substantial increase in cost.

As a method for solving the foregoing problems, there has been known one which is described in a literature entitled "Theory and Practical Design for AC Servo System" by H. Sugiyama et al., Ver. 4 Feb. 10, 1997, pp. 44–47, Sougou-Denshi Publishing Company, Tokyo, Japan. In the method described in the literature, the rate of an inverter output voltage to a supply voltage VB, that is, the utilization factor of a power supply is improved by superposing a third-order harmonic wave on each of the reference waves of the phase voltage commands $Vu0^*$, $Vv0^*$, $Vw0^*$ and by generating motor control signals based on the superposed phase voltage commands $Vu1^*$, $Vv1^*$, $Vw1^*$.

In the known method, the amplitude of the reference waves of the phase voltage commands $Vu0^*$, $Vv0^*$, $Vw0^*$ is raised to $2/\sqrt{3} \cdot \alpha \cdot Vc$, and the motor control signals are generated based on the phase voltage commands $Vu1^*$, $Vv1^*$, $Vw1^*$ each of which has the third-order harmonic wave superposed thereon to have reference waves represented by the following expression (2), as shown in FIG. 6.

(Expression 2)

$$\left. \begin{array}{l} Vu1* = 2/\sqrt{3} \cdot \alpha \cdot Vc \, (\sin\theta + 1/6 \cdot \sin 3\theta) \\ Vv1* = 2/\sqrt{3} \cdot \alpha \cdot Vc \, (\sin(\theta - 2\pi/3) + 1/6 \cdot \sin 3\theta) \\ Vw1* = 2/\sqrt{3} \cdot \alpha \cdot Vc \, (\sin(\theta + 2\pi/3) + 1/6 \cdot \sin 3\theta) \end{array} \right\} \quad (2)$$

In this method, even where the amplitude of the reference waves of the phase voltage commands $Vu0^*$, $Vv0^*$, $Vw0^*$ is raised to $2/\sqrt{3} \cdot \alpha \cdot Vc$, the maximum value of the phase voltage commands $Vu1^*$, $Vv1^*$, $Vw1^*$ after the superposition becomes $|\alpha \cdot Vc|$ and does not exceed the amplitude Vc of the triangular wave, because the maximum value (absolute value) of the amplitude of $(\sin\theta + 1/6 \cdot \sin 3\theta)$ is $\sqrt{3}/2$.

Accordingly, it is possible to perform the PWM control normally within the range of $-1 \leq \alpha \leq 1$ without loosing the proportional relationship between the amplitude of the reference waves of the line voltages Vuv, Vvw, Vwu for the respective phases and the modulation factor ($\alpha$). As a consequence, it can be realized to raise up to the supply voltage VB the maximum value (absolute value) of the amplitude of the line voltages Vuv, Vvw, Vwu for the respective phases. That is, by employing the third-order harmonic wave superposition method as described above, it can be realized to heighten the inverter output voltage without boosting the supply voltage VB and hence, to raise the line voltages Vuv, Vvw, Vwu for the respective phases U, V, W to be supplied to the brushless motor.

However, for the employment of the foregoing third-order harmonic wave superposition method, it is required to provide a table which has stored arithmetic results of sin 3θ in advance or to calculate the sin 3θ by arithmetic operation one after another. To this end, where the table is used, it is unavoidable that the manufacturing cost increases with increase in the memory capacity for storing the table. Instead, where the sin 3θ is calculated by arithmetic operation, there arises another problem that the performance in control is liable to be degraded due to substantial delay in operation interval caused by increase in the operation load.

SUMMARY OF THE INVENTION

Accordingly, it is a primary object of the present invention to provide an improved motor control device and an improved motor control method which device and method are capable of heightening its output voltage without bringing about increase in manufacturing cost and delay in arithmetic operation interval.

Briefly, a motor control device according to the present invention is provided with an output circuit. The output circuit is composed of a control circuit for generating control signals based on the comparison of phase voltage commands for three phases with a carrier wave and plural switching elements controllable by the control signals. The output circuit supplies drive electric powers for three phases to a brushless motor based on the control of the switching elements. The motor control device further comprises neutral point shift means for shifting a neutral point of the phase voltage commands. The neutral point shift means is operable to shift the neutral point of the phase voltage commands so that the values of the phase voltage commands after the shifting of the neutral point come within the amplitude of the carrier wave.

With this construction, the maximum value of the amplitude of reference waves of the phase voltage commands can be raised to two over square root of three $(2/\sqrt{3})$ times as large as the carrier wave, even in which case control can be normally performed without loosing the proportional relationship between the amplitude of the reference waves of the line voltages for the respective phases and the modulation factor. Accordingly, like in the third-order harmonic superposition method, it can be realized to heighten the inverter output voltage to the supply voltage by improving the power supply utilization factor without boosting the supply voltage. As a result, it can be realized to raise the line voltages between the respective phases which are to be supplied to the brushless motor, without bringing about increase in manufacturing cost. Further, unlike in the third-order harmonic wave superposition method, it is not required to provide a table which has stored the results of calculations for sin 3θ in advance or to obtain the sin 3θ by calculation one after another. Therefore, it does not occur that the cost increases with increase in the memory capacity for storing the table or that substantial delay in the calculation interval is caused by increase in calculation road for the calculation of the sin 3θ.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
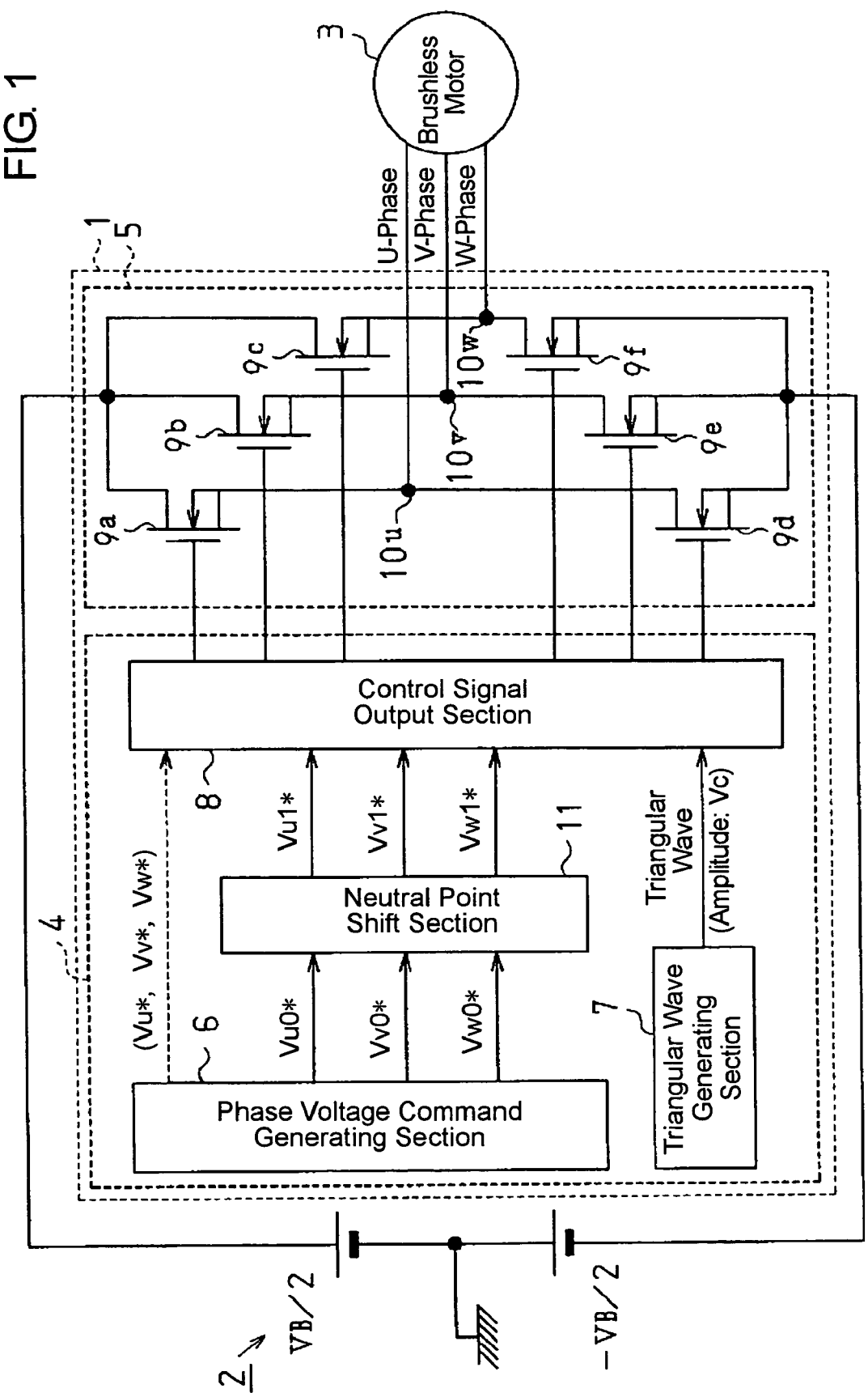
FIG. 1 is a block diagram showing the schematic construction of a motor control device in one embodiment according to the present invention.

Hereafter, one embodiment according to the present invention will be described with reference to the accompanying drawings. Referring now to FIG. 1, a motor control device 1 in the present embodiment is shown connected between a DC (direct current) power supply 2 and a brushless motor 3 for generating drive electric powers for three phases U, V, W based on a DC (direct current) voltage supplied from the DC power supply 2 and for then supplying the drive electric powers to the brushless motor 3.

The motor control device 1 is composed of a control circuit 4 and an output circuit 5. The control circuit 4 is provided with a phase voltage command generating section 6, a triangular wave generating section 7, and a control signal output section 8. The phase voltage command generating section 6 is responsive to a command signal (position command) and output signals from various sensors (not shown) which detect the state (i.e., supply current and the speed and position of an output shaft) of the brushless motor 3. Based on the command signal and the output signals, the generating section 6 determines the respective amplitudes V* of the phase voltage commands Vu*, Vv*, Vw* at a given time by the execution of a feedback control such as, e.g., Pl control and outputs the phase voltage commands Vu*, Vv*, Vw* to the control signal output section 8.

The triangular wave generating section 7 generates a triangular wave signal (hereafter referred simply as "triangular wave") of an amplitude Vc as a carrier wave and outputs the triangular wave to the control signal output section 8. The amplitude Vc of the triangular wave output from the triangular wave generating section 7 depends on a supply voltage VB of the DC power supply 2. Where any restraint (restraint factor β(0<β≦1), duty limit in PWM control (referred to later) or the like) is not imposed on an inverter output, the triangular wave generating section 7 outputs to the control signal output section 8 a triangular wave having its voltage which is one half (½) of the supply voltage VB of the DC power supply 2, that is, having an amplitude Vc=VB/2.

The control signal output section 8 compares each of the phase voltage commands Vu*, Vv*, Vw* input from the phase voltage command generating section 6 with the triangular wave input from the triangular wave generating section 7, generates motor control signals (not shown) for the U, V and W phases whose pulse widths have been modulated, and outputs the motor control signals to the output circuit 5.

The output circuit 5 is provided with plural (e.g., six) power MOSFETs (Metal Oxide Semiconductor Field Effect Transistors) which relates in number to the phases of the brushless motor 3. The output circuit 5 is constituted by connecting in parallel a series circuit of FET 9a and FET 9d, another series circuit of FET 9b and EFT 9e, and another series circuit of FET 9c and FET 9f. And, a connection point 10u between FET 9a and FET 9d is connected to a U-phase coil of the brushless motor 3, a connection point 10v between FET 9b and FET 9e is connected to a V-phase coil of the brushless motor 3, and a connection point 10w between FET 9c and FET 9f is connected to a W-phase coil of the brushless motor 3. In this particular embodiment, these connection points 10u, 10v and 10w respectively constitute output points for the U, V and W phases in the output circuit 5.

The FETs 9a to 9f have their gate terminals, to which the motor control signals (not shown) are respectively applied from the control signal output section 8. In response to the motor control signals, the FETs 9a to 9f are switched into ON or OFF, and drive electric powers for the U, V and W phases are supplied from the connection points 10u, 10v and 10w to the brushless motor 3, so that the brushless motor 3 can be rotated. That is, the motor control device 1 in this particular embodiment controls the operation (i.e., rotation) of the brushless motor 3 by controlling the drive electric powers to be supplied to the brushless motor 3 under the PWM control of the triangular wave comparison type.

Further, in the present embodiment, the control circuit 4 is provided with a neutral point shift section 11 as neutral point shift means for shifting a neutral point common to the phase voltage commands Vu*, Vv*, Vw*, namely, a command neutral point N1. The phase voltage command generating section 6 is connected to the control signal output section 8 through the neutral point shift section 11. Thus, the phase voltage commands Vu*, Vv*, Vw* generated by the phase voltage command generating section 6 are input to the control signal output section 8 through the neutral point shift section 11.

Herein, for the purpose of explanation, hereafter, the phase voltage commands input to the neutral point shift section 11 are taken as phase voltage commands Vu0*, Vv0*, Vw0*, and the phase voltage commands output from the neutral point shift section 11 to the control signal output section 8 after the shifting of the neutral point are taken as phase voltage commands Vu1*, Vv1*, Vw1*.

In the present embodiment, the neutral point shift section 11 shifts the neutral point N1 of the phase voltage commands Vu0*, Vv0*, Vw0* input from the phase voltage command generating section 6 so that values of the phase voltage commands Vu1*, Vv1*, Vw1* after the shifting of the neutral point come within the range of the amplitude Vc of the triangular wave. Thus, the control signal output section 8 generates the motor control signals based on the phase voltage commands Vu1*, Vv1*, Vw1* which are input from the neutral point shift section 11 after the shifting of the neutral point.

More specifically, the phase voltage command generating section 6 in the embodiment generates the phase voltage commands Vu0*, Vv0*, Vw0* having respective reference waves represented by the following expression (3). The phase voltage command generating section 6 determines the amplitude V* for the commands Vu0*, Vv0*, Vw0* within the range of |V*|≦2/√3·Vc by varying the modulation factor (α) within the range of −1≦α≦1, and inputs the determined amplitude V* to the neutral point shift section 11.

(Expression 3)

$$Vu0* = V* \cdot \sin\theta \\ Vv0* = V* \cdot \sin(\theta - 2\pi/3) \\ Vw0* = V* \cdot \sin(\theta + 2\pi/3)$$ (3)

$$(V*) = 2/\sqrt{3} \cdot \alpha \cdot Vc \quad \text{provided: } \alpha(-1 \le \alpha \le 1)$$

Herein, the maximum amplitude or value of the amplitude V* of the reference waves for the phase voltage commands Vu0*, Vv0*, Vw0* output from the phase voltage command generating section 6 is |2/√3·Vc|. Therefore, like the case that the modulation factor (α) is set to 1 for example (referred to FIG. 2), it may occur in dependence upon the value of the modulation factor (α) that the values (absolute values) of the phase voltage commands Vu0*, Vv0*, Vw0* exceed the amplitude Vc of the triangular wave.

Figure 3:
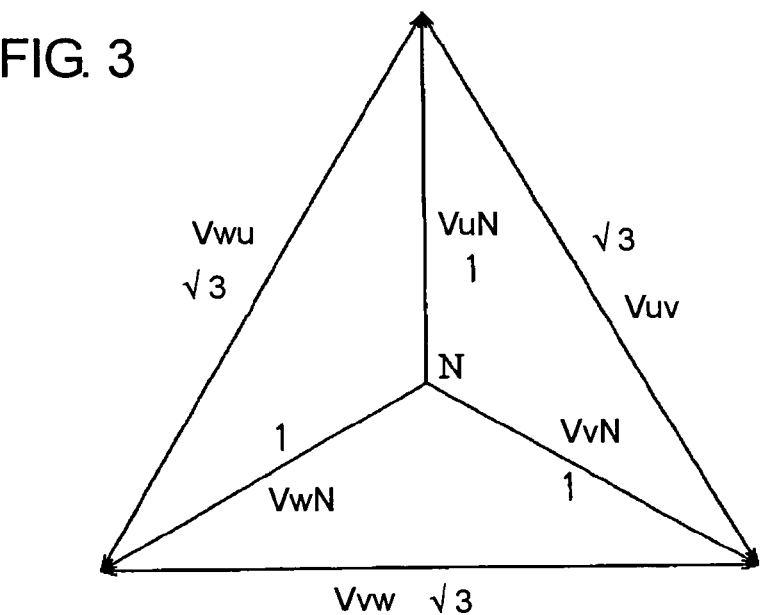
FIG. 3 is an explanatory representation showing the relationship between phase voltages and line voltages.

However, since a phase difference of 2π/3 exists between every two of the phase voltage commands Vu0*, Vv0*, Vw0*, the potential differences between the phase voltage commands Vu0*, Vv0*, Vw0* also become square root of three (√3) times as large as the amplitude V* of the reference waves and hence, come within the range of 2 Vc so far as the amplitude V* of the reference waves are within the range of |V*|≦2/√3·Vc. This is similar to fact that the line voltages Vuv, Vvw, Vwu between the respective phases become square root of three (√3) times as large as the phase voltages VuN, VvN, VwN, as shown in FIG. 3.

The neutral point shift section 11 utilizes the foregoing principle. Where each value of the phase voltage commands Vu0*, Vv0*, Vw0* input from the phase voltage command generating section 6 exceeds the amplitude Vc of the triangular wave, the neutral point shift section 11 shifts the command neutral point N1 of the phase voltage commands Vu0*, Vv0*, Vw0* so that the values of the phase voltage commands Vu1*, Vv1*, Vw1* after the shifting of the neutral point come within the amplitude Vc of the triangular wave.

Figure 4:
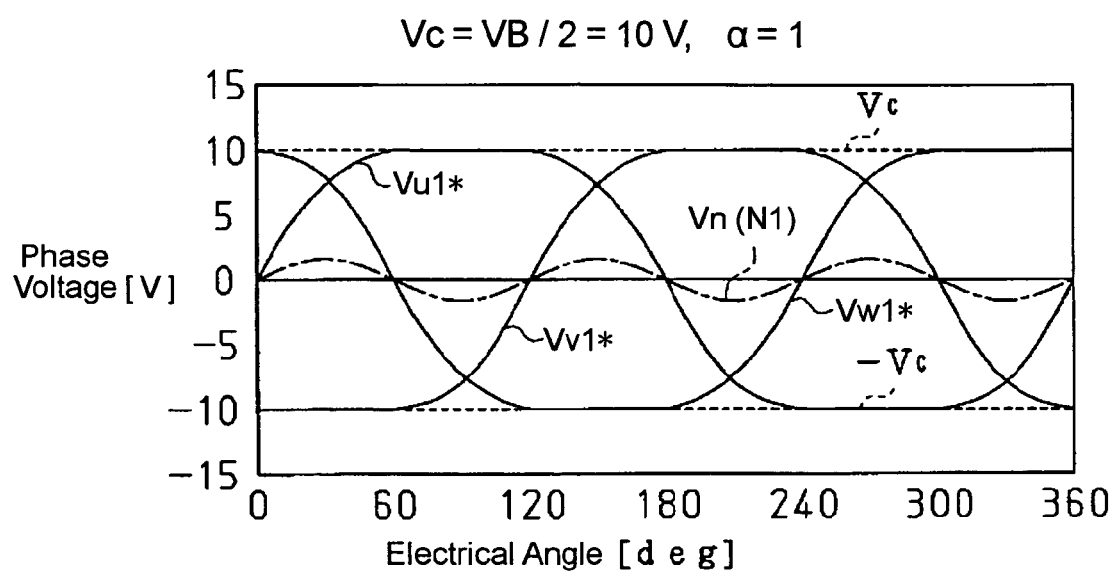
FIG. 4 is a graph showing the wave forms of the phase voltage commands with a neutral point thereof having been shifted.

Specifically, as shown in FIG. 4, the command neutral point N1 for the phase voltage commands Vu0*, Vv0*, Vw0* is shifted toward the minus side where the value of any one of the phase voltage commands Vu0*, Vv0*, Vw0* exceeds a plus side peak +Vc and toward the plus side where the value of any one of the phase voltage commands Vu0*, Vv0*, Vw0* exceeds a minus side peak −Vc.

More specifically, the neutral point shift section 11 judges whether or not the values of the phase voltage commands Vu0*, Vv0*, Vw0* input from the phase voltage command generating section 6 exceed the amplitude Vc of the triangular wave. If the values are judged to have exceeded the amplitude Vc of the triangular wave (i.e., |Vu0*|>Vc, |Vv0*|>Vc or |Vw0*|>Vc), the neutral point shift section 11 calculates the difference Vnu, Vnv or Vnw therebetween by either of the following expressions (4), (5) or (6) and then, calculates a neutral point shift value Vn by the following expression (7).

(Expression 4)

$$Vnu = \text{sign}(Vu0*)(|Vu0*| - Vc) \quad (4)$$

(Expression 5)

$$Vnv = \text{sign}(Vv0*)(|Vv0*| - Vc) \quad (5)$$

(Expression 6)

$$Vnw = \text{sign}(Vw0^*)(|Vw0^*| - Vc) \quad (6)$$

(Expression 7)

$$Vn = Vnu + Vnv + Vnw \quad (7)$$

Herein, a function sign (x) in each of the expressions (4) to (6) is the function which indicates "1" if the value (x) is plus, "0" if the value (x) is "0" or "−1" if the value (x) is minus. Since a phase difference of 2π/3 exists between the phase voltage commands Vu0*, Vv0*, Vw0*, it does not occur that the values of the phase voltage commands Vu0*, Vv0*, Vw0* simultaneously exceed the amplitude Vc of the triangular wave. Thus, the neutral point shift section 11 calculates the difference Vnu, Vnv or Vnw using an applicable one of the above expressions (4) to (6).

Then, the neutral point shift section 11 subtracts the neutral point shift value Vn from each of the phase voltage commands Vu0*, Vv0*, Vw0*. Thus, the values of the phase voltage commands Vu0*, Vv0*, Vw0* after the shifting of the neutral point are varied by the neutral point shift value Vn thereby to come within the amplitude Vc of the triangular wave.

Figure 2:
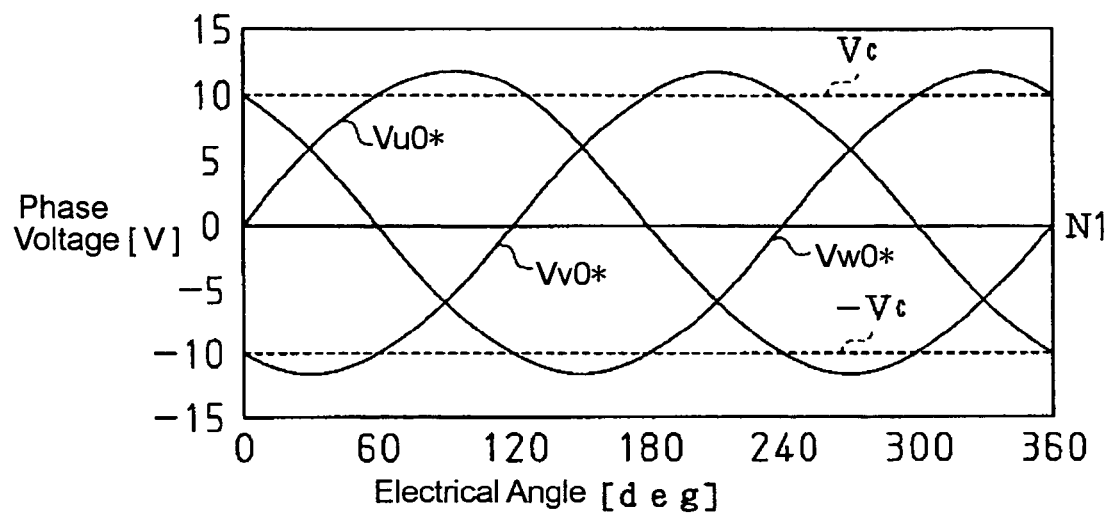
FIG. 2 is a graph showing the wave forms of phase voltage commands.

As shown in FIG. 2, each of the phase voltage commands Vu0*, Vv0*, Vw0* is in the balanced state at a time point when input to the neutral point shift section 11. Since the neutral point shift section 11 subtracts the neutral point shift value Vn from each of the phase voltage commands Vu0*, Vv0*, Vw0*, each of the phase voltage commands Vu1*, Vv1*, Vw1* after the shifting of the neutral point has its value varied by the neutral point shift value Vn with the balanced state remaining as it is. As a consequence, the electric potential at the command neutral point N1 is lowered where the neutral point shift value Vn is plus and is heightened where the neutral point shift value Vn is minus.

More specifically, as shown in FIG. 4, by subtracting the neutral point shift value Vn from each of the phase voltage commands Vu0*, Vv0*, Vw0*, the neutral point shift section 11 shifts the command neutral point N1 toward the minus side where the neutral point shift value Vn is plus and shifts the command neutral point N1 toward the plus side where the neutral point shift value Vn is minus. Thereafter, the neutral point shift section 11 inputs the phase voltage commands Vu1*, Vv1*, Vw1* after the shifting of the neutral point to the control signal output section 8. Thus, the control signal output section 8 generates motor control signals based on the phase voltage commands Vu1*, Vv1*, Vw1* after the shifting of the neutral point.

That is, although the amplitude of the reference waves for the phase voltage commands Vu0*, Vv0*, Vw0* input to the neutral point shift section 11 could have the maximum value $|2/\sqrt{3} \cdot Vc|$, the shifting of the command neutral point N1 causes the maximum value |Vc| to be given to the phase voltage commands Vu1*, Vv1*, Vw1* which make the basis for the generation of the motor control signals after the shifting of the neutral point. Thus, it does not occur that the maximum value exceeds the amplitude Vc of the triangular wave.

Accordingly, even where raising the maximum value of the amplitude of the reference waves for the phase voltage commands Vu*, Vv*, Vw* up to $|2/\sqrt{3} \cdot Vc|$, the motor control device 1 is enabled to perform the PWM control normally within the range of $-1 \leq \alpha \leq 1$ without loosing the proportional relationship between the amplitude of the reference waves of the line voltages Vuv, Vvw, Vwu for the respective phases and the modulation factor (α). As a result, it can be realized to heighten the inverter output voltage, so that the line voltages Vuv, Vvw, Vwu for the respective phases can be raised up to the supply voltage VB.

In short, by shifting the command neutral point N1 of the respective phase voltage commands Vu*, Vv*, Vw*, the motor control device 1 in the foregoing embodiment is able, as is done in the third-order harmonic wave superposition method, to heighten the inverter output voltage through the improvement in the utilization factor of the electric power source without boosting the supply voltage VB itself and hence, to raise the line voltages Vuv, Vvw, Vwu between the U, V, W phases to be supplied to the brushless motor 3.

Next, description will be made in detail regarding a neutral point shift processing of the phase voltage commands which is executed by the neutral point shift section 11.

Figure 5:
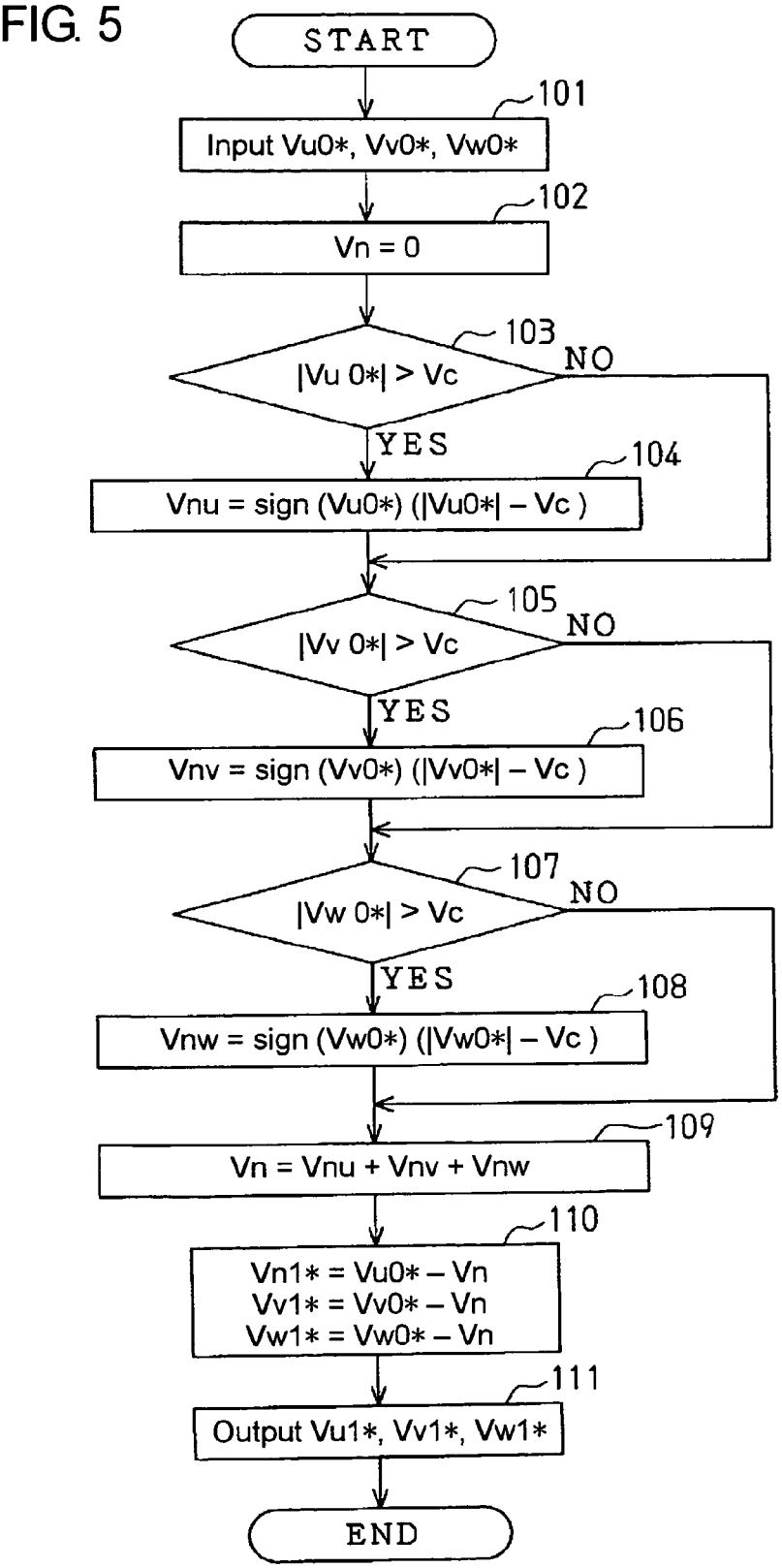
FIG. 5 is a flow chart showing a neutral point shift processing.
Figure 6:
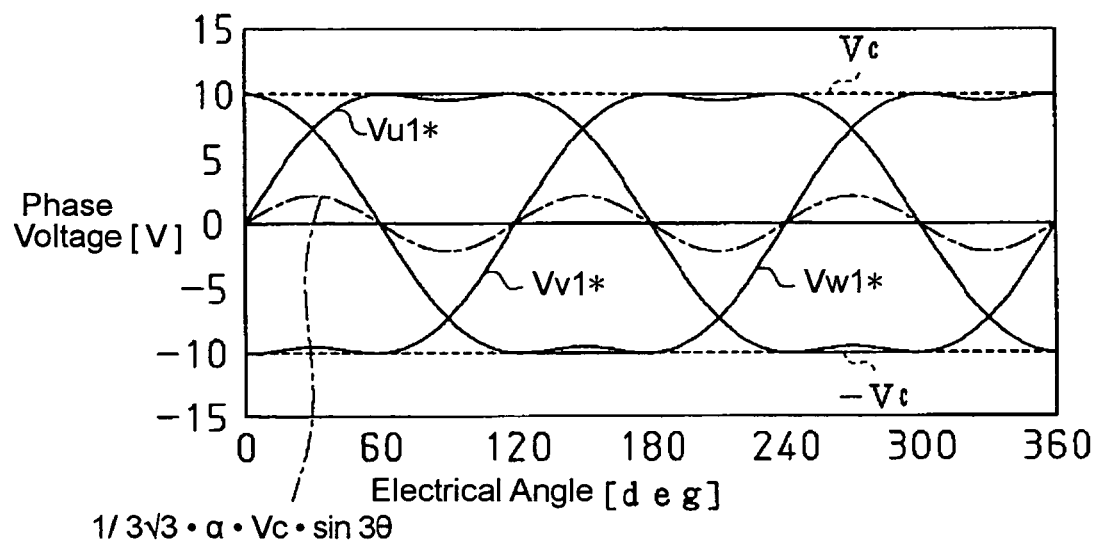
FIG. 6 is a graph showing the wave forms of phase voltage commands in the case that third-order harmonic wave superposition method is practiced.

As shown in FIG. 5, when having the respective phase voltage commands Vu0*, Vv0*, Vw0* input thereto from the phase voltage command generating section 6 (step 101), the neutral point shift section 11 first resets the neutral point shift value Vn, that is, makes Vn=0 (step 102).

Then, the neutral point shift section 11 judges whether or not each value (absolute value) of the phase voltage commands Vu0*, Vv0*, Vw0* input from the phase voltage command generating section 6 exceeds the amplitude Vc of the triangular wave, and when judging that it exceeds the amplitude Vc, calculates the neutral point shift value Vn from the differences therebetween. (steps 103 through 109).

Specifically, the neutral point shift section 11 first judges whether or not the value of the phase voltage command Vu0* for the U-phase exceeds the amplitude Vc of the triangular wave (step 103), and when judging that the value exceeds the amplitude, calculates the difference Vnu therebetween by the above expression (4). (step 104).

Following step 103 or step 104, the neutral point shift section 11 then judges whether or not the value of the phase voltage command Vv0* for the V-phase exceeds the amplitude Vc of the triangular wave (step 105), and when judging that the value exceeds the amplitude, calculates the difference Vnv therebetween by the above expression (5). (step 106).

Further, following step 105 or step 106, the neutral point shift section 11 then judges whether or not the value of the phase voltage command Vw0* for the W-phase exceeds the amplitude Vc of the triangular wave (step 107), and when judging that the value exceeds the amplitude, calculates the difference Vnw therebetween by the above expression (6). (step 108).

Thereafter, the neutral point shift section 11 sums the respective differences Vnu, Vnv and Vnw by the above expression (7) thereby to calculate the neutral point shift value Vn. (step 109).

In this way, of the steps 104, 106 and 108, one or more steps applicable to the foregoing conditional judgments are executed. Therefore, where it is judged at the steps 103, 105 and 107 that all values of the respective phase voltage commands Vu0*, Vv0*, Vw0* are less than or equal to the amplitude Vc of the triangular wave, the neutral point shift value Vn remains to be 0 (zero).

After calculating the neutral point shift value Vn through the execution of the steps 103 through 109, the neutral point shift section 11 shifts the command neutral point N1 of the respective phase voltage commands Vu0*, Vv0*, Vw0* by subtracting the calculated neutral point shift values Vn from each of the phase voltage commands Vu0*, Vv0*, Vw0*. (step 110) Subsequently, the neutral point shift section 11 outputs the phase voltage commands Vu1*, Vv1*, Vw1* with the neutral point having been shifted, to the control signal output section 8. (step 111) Needless to say, the command neutral point N1 of the phase voltage commands Vu0*, Vv0*, Vw0* is not shifted where the neutral point shift value Vn calculated at step 109 is 0 (zero).

As described above, the present embodiment features the following respects.

(1) The motor control device 1 is provided with the neutral point shift section 11 for shifting the command neutral point N1 of the phase voltage commands Vu*, Vv*, Vw*. The neutral point shift section 11 shifts the command neutral point N1 of the phase voltage commands Vu*, Vv*, Vw* input thereto so that the values of the phase voltage commands Vu1*, Vv1*, Vw1* after the shifting of the neutral point, come within the range of the amplitude Vc of the triangular wave, and outputs the phase voltage commands Vu1*, Vv1*, Vw1* which have been shifted with the neutral point, to the control signal output section 8.

With the construction so taken, the values of the phase voltage commands Vu1*, Vv1*, Vw1* which constitute the basis for the motor control signals become less than or equal to the amplitude Vc of the triangular wave even when the maximum value of the amplitude of the reference waves for the phase voltage commands Vu*, Vv*, Vw* is raised up to $|2/\sqrt{3} \cdot Vc|$. Thus, it can be realized to perform the PWM control normally within the range of $-1 \leq \alpha \leq 1$ without loosing the proportional relationship between the amplitude of the reference waves for the line voltages Vuv, Vvw, Vwu and the modulation factor ($\alpha$). Accordingly, as is done in the third-order harmonic wave superposition method, the inverter output voltage can be heightened to the supply voltage |VB| through the improvement in the utilization factor of the electric power source without boosting the supply voltage VB itself, so that the line voltages Vuv, Vvw, Vwu between the respective phases to be supplied to the brushless motor 3 can be raised without bringing about substantial increase in manufacturing cost.

Further, it is not required that as is true with the third-order harmonic wave superposition method, a table is provided which have stored results of calculations for sin 3θ in advance or arithmetic operations are performed one after another for the sin 3θ. Therefore, it does not occur that the cost increases with increase in the memory capacity for storing the table or that substantial delay in the calculation interval is caused by increase in calculation road for the calculations of the sin 3θ.

(2) The neutral point shift section 11 judges whether or not each value of the phase voltage commands Vu0*, Vv0*, Vw0* input from the phase voltage command generating section 6 exceeds the amplitude Vc of the triangular wave, and when judging that it exceeds the amplitude Vc, calculates the neutral point shift value Vn from the differences therebetween. Then, the neutral point shift section 11 shifts the command neutral point N1 of the phase voltage commands Vu0*, Vv0*, Vw0* by subtracting the neutral point shift value Vn from each of the phase voltage commands Vu0*, Vv0*, Vw0*.

With the construction so taken, the load in calculation is light compared with the case wherein the sin 3θ is obtained by calculation in the third-order harmonic superposition method. Thus, delay in calculation interval does not occur, whereby the high performance in control can be ensured.

The foregoing embodiment may be modified as follows: That is, although in the foregoing embodiment, the output circuit 5 is constituted by the power MOSFETs, it may be constituted by other switching elements such as power transistors or the like. The phase voltage command generating section 6, the triangular wave generating section 7, the control signal output section 8 and the neutral point shift section 11 which all constitute the control circuit 4 in the foregoing embodiment may be materialized in the form of software or hardware.

An invention which is grasped from the foregoing embodiment in addition to those defined by the appended claims is described as follows:

(a) An electric power steering device having a motor control device which is set forth in any one of the appended Claims 1 to 4.

Finally, various features and many of the attendant advantages in the foregoing embodiment will be summarized as follows:

In the motor control device and the motor control method in the first embodiment shown in FIG. 1, the maximum value of the amplitude of the reference waves for the phase voltage commands Vu0*, Vv0*, Vw0* can be raised to two over square root of three ($2/\sqrt{3}$) times as large as the carrier wave, even in which case control can be normally performed without loosing the proportional relationship between the amplitude of the reference waves of the line voltages Vuv, Vvw, Vwu for the respective phases and the modulation factor ($\alpha$). Accordingly, as is done in the third-order harmonic superposition method, it can be realized to heighten the inverter output voltage to the supply voltage VB by improving the power supply utilization factor without boosting the supply voltage VB itself. As a result, it can be realized to raise the line voltages Vuv, Vvw, Vwu between the respective phases which are to be supplied to the brushless motor 3, without brining about increase in manufacturing cost. Further, unlike in the third-order harmonic wave superposition method, it is not required to provide a table which has stored the results of calculations for sin 3θ in advance or to obtain the sin 3θ by calculation one after another. Therefore, it does not occur that the cost increases with increase in the memory capacity for storing the table or that substantial delay in the calculation interval is caused by increase in calculation road for the calculation of the sin 3θ.

Also in the motor control device in the first embodiment shown in FIGS. 1 and 5, because the neutral point of the phase voltage commands Vu0*, Vv0*, Vw0* is shifted only where the value of any phase voltage command Vu0*, Vv0* or Vw0* exceeds the amplitude Vc of the carrier wave, the load in calculation is small. Accordingly, substantial delay does not occur in calculation interval.

Also in the motor control device in the first embodiment shown in FIG. 1, the load in calculation is light compared with the case wherein the sin 3θ is obtained by calculation in the third-order harmonic superposition method. Accordingly, substantial delay does not occur in calculation interval.

Obviously, further numerous modifications and variations of the present invention are possible in light of the above teachings. It is therefore to be understood that within the scope of the appended claims, the present invention may be practiced otherwise than as specifically described herein.

What is claimed is:

1. A motor control device comprising:
   a control circuit configured to generate control signals based on a comparison of phase voltage commands for three phases with a carrier wave;
   plural switching elements configured to be controllable by the control signals;
   an output circuit configured to supply three-phase drive electric powers to a brushless motor based on the control of the plural switching elements, wherein the control circuit includes a neutral point shift means for shifting a neutral point of the phase voltage commands, the neutral point shift means being operable to shift the neutral point of the phase voltage commands so that an amplitude of each of the phase voltage commands, after the shifting of the neutral point, only comes within an amplitude of the carrier wave.

2. The motor control device as set forth in claim 1, wherein the neutral point shift means shifts the neutral point of the phase voltage commands where an amplitude of any one of the phase voltage commands after the shifting of the neutral point exceeds the amplitude of the carrier wave.

3. The motor control device as set forth in claim 1, wherein the neutral point shift means judges whether or not an amplitude of each of the phase voltage commands exceeds an amplitude of the carrier wave, and when judging that the amplitude of the phase voltage commands exceeds the amplitude of the carrier wave, shifts the neutral point of the phase voltage commands by subtracting a difference between the amplitude of the carrier wave and the amplitude from each of the phase voltage commands.

4. The motor control device of claim 1, wherein the amplitudes of the phase voltage commands are raised to $2/\sqrt{3}$ times as large as the amplitude of the carrier wave and a proportional relationship between amplitudes of line voltages and a modulation factor exists.

5. A motor control method for supplying three-phase drive electric powers to a brushless motor, comprising:

generating control signals based on a comparison of phase voltage commands for three phases with a carrier wave;

supplying three-phase drive electric powers to a brushless motor based on the control a plurality of switching elements, shifting a neutral point of the phase voltage commands is shifted so that an amplitude of each of the phase voltage commands, after the shifting of the neutral point, only comes within the range of an amplitude of the carrier wave.

\* \* \* \* \*